June 13, 1939.     H. LINET     2,161,830

CUTTING FUR PELTS

Filed May 19, 1936     4 Sheets-Sheet 1

Inventor
Harry Linet,
By Ivan P. Tashof,
Attorney

June 13, 1939. H. LINET 2,161,830
CUTTING FUR PELTS
Filed May 19, 1936 4 Sheets-Sheet 2
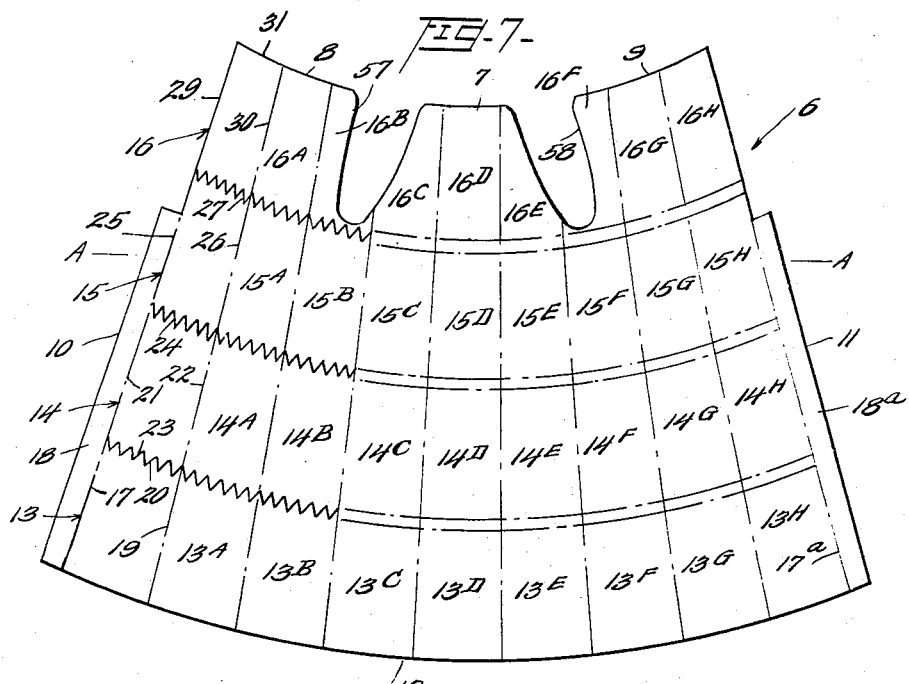
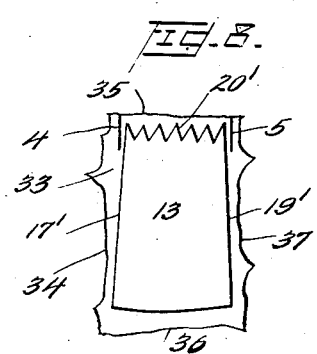
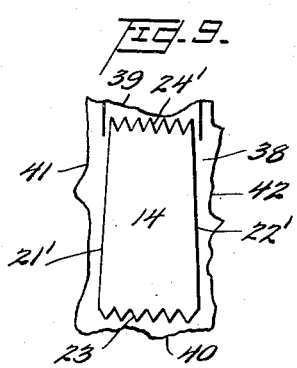
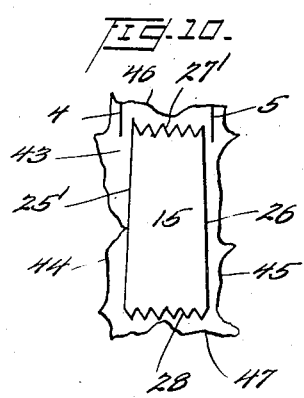
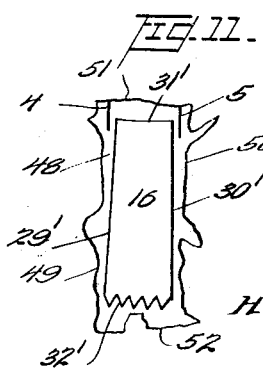
Inventor
Harry Linet,
By
Attorney

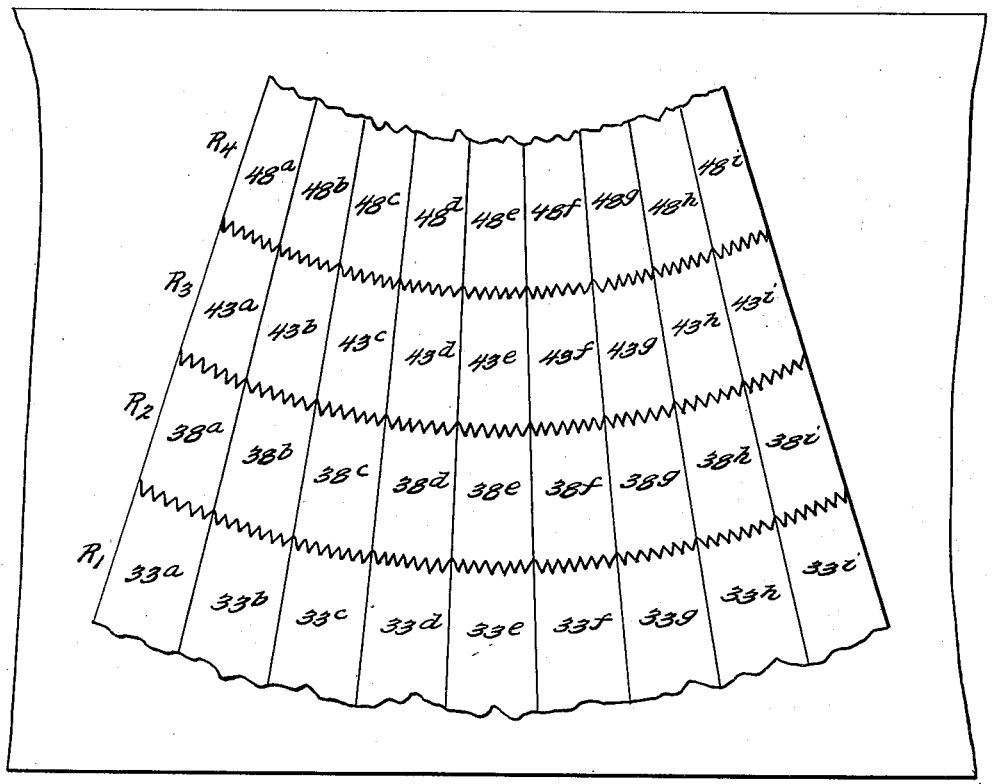
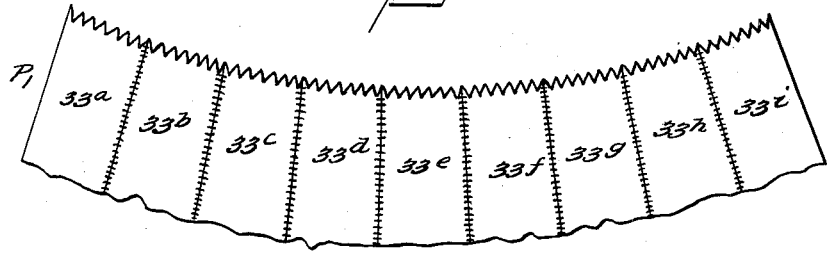

June 13, 1939. H. LINET 2,161,830
CUTTING FUR PELTS
Filed May 19, 1936 4 Sheets-Sheet 4
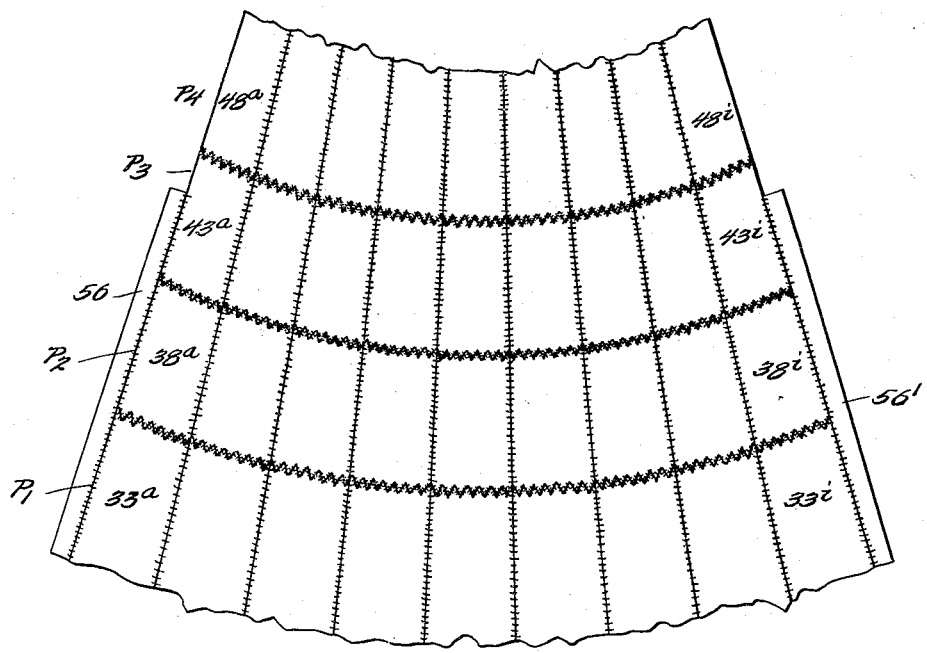
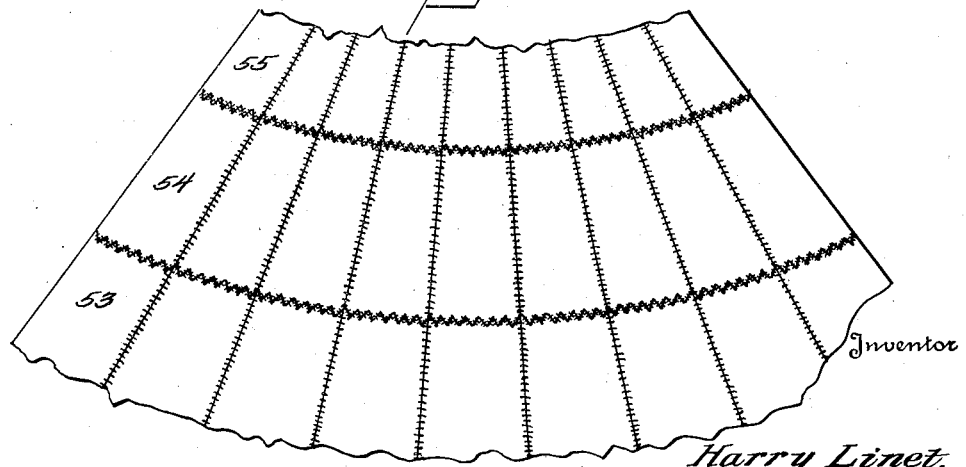

Patented June 13, 1939

2,161,830

UNITED STATES PATENT OFFICE 2,161,830

CUTTING FUR PELTS

Harry Linet, Yonkers, N. Y.

Application May 19, 1936, Serial No. 80,607

5 Claims. (Cl. 149—28)

The present invention relates to improvements in cutting fur skins and especially fur pelts, and the assembling of said skins into a fur garment. The invention also comprises a pattern system for the production of individual skins, said skins, after cutting, being adapted to be assembled into panels or plates and finally into a finished fur garment.

The invention will be disclosed in connection with the accompanying drawings in which.

Figure 1:
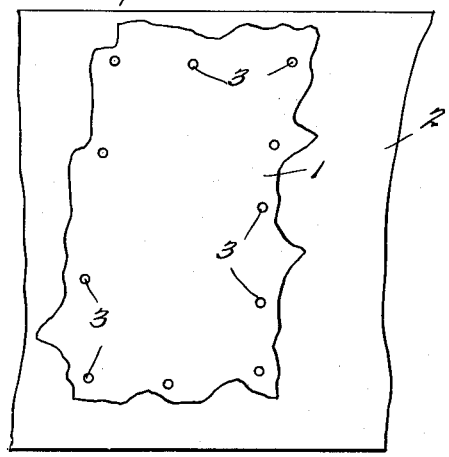
Figure 1 is a plan view of an individual pelt pinned or nailed to a suitable supporting medium for the purpose of stretching the individual pelt.

Figures 3 to 6, inclusive, diagrammatically represent piles of furs assorted according to size in contemplation of the patterns to be used in accordance with the present invention.

Figure 7 is a plan view of a body pattern for the production of a certain style of garment, the collar and sleeves of the pattern not being shown.

Figures 8 to 11, inclusive, show fractional patterns derived from the main body pattern, said fractional patterns being assembled on fur skins of different size.

Figure 12 shows a number of fur pelts cut in accordance with the present invention and matched into unsewed rows of skins, said assembly partially simulating the form of the final garment.

Figure 13 shows a row of matched skins sewn together to provide a constituent fur panel of the final fur garment.

Figure 14 shows a plan view of the skin panels sewed together to provide the body portion of the final garment.

Figure 15 is a plan view showing fractional or sub-patterns of modified form, and particularly adaptable for the protection of a Princess style garment.

In carrying out the present invention, the fur pelt 1 is first examined and the defective parts thereof are cut out. The edges remaining after the cutting out of said parts are sewed together. Thereafter the fur pelt 1 is nailed on a board 2 by means of nails 3 to thereby stretch the fur pelt to get the utmost fullness of the skin. The pelt 1 is then taken off the board and inspected by the cutter in order to ascertain what portions of the pelt are to be cut away. The cutter, after such inspection, slits the fur pelt 1 along lines 4 and 5, these slits acting as a guide to any unexperienced cutter who subsequently cuts the fur according to the pattern, as hereinafter described.

In other words, the operator or cutter who slits the pelt 1 at this stage of the method is a man who has had a relatively long experience in the judging of the qualities of furs and their superior and inferior portions. After the fur leaves the hands of this experienced operator, it passes into the hands of relatively inexperienced operators, or operators with little accurate judgment as to the quality of the fur and the slits 4 and 5 show the inexperienced operators exactly where to use the pattern. While the fur is provided with slits 4 and 5, it is, of course, within the province of the present invention to merely mark the fur with semi-permanent marks which will perform an equivalent function to that performed by the slits.

After each fur has been stretched and slit, it is put into one of piles A, B, C or D, the factor which determines which pile the fur is placed in being the size of the fur in relation to the sectional patterns made in accordance with the present invention.

As shown in Figure 7, there is provided, in accordance with the present invention, a main ordinary body pattern 6. In this figure, there is illustrated a pattern suitable for production of a garment of the "swagger" type.

The main pattern 6 is divided into fractional patterns of suitable size depending on the size of the skins to be used, and the number of skins to be used in the respective longitudinal portions of the garment.

The pattern, as shown in Figure 7, comprises a back portion 7 and side portions 8 and 9, the latter having side edges 10 and 11. The side portions of the pattern and the back portion of the pattern terminate in a common lower edge 12.

It is to be noted that the pattern which is illustrated is for a swagger type coat, and is, of course, provided with more fullness at and adjacent its bottom portion than at the waist line A—A, whereby the side edges 10 and 11 of the pattern are positioned with respect to the bottom edge 12 at an angle less than a right angle. It is to be further noted, as shown in Figure 7, that the edges 10 and 11 converge towards each other.

The main pattern 6 is divided into a series of longitudinally extending sectional patterns 13, 14, 15, 16, these patterns forming what may be termed a longitudinally extending strip, these strips preferably being substantially the full length of the main pattern. It is to be noted that the sectional pattern 13 is provided with a cutting line 17 and 17a separated from the edges 10 and 11 of the main pattern. This provides a facing portion 18, the function of which will be described hereinafter. The main pattern is also provided with a cutting line 17a separated from the edge 11 of the main pattern. This provides a facing portion 18a.

The pattern 13 is also provided with a side cutting line 19 and a top zig-zag cutting line 20. It is to be noted that the sectional pattern 13 is wider at its base than at the portion adjacent its top edge 20', and that its side edges 17' and 19' slightly converge towards each other, these edges resulting from cutting along the lines 17 and 19 of the pattern.

The width and length of this pattern is determined by the size of the skins available for the production of the garment. As is well known, certain skins, for example rabbit fur skins, come in different lengths and widths. As previously stated, piles A, B, C and D are sorted out mainly according to the width of the pelts. In pile A is the pelt with the largest average width, and in piles B, C and D are pelts of successively decreasing widths.

For sub-pattern 13, skins having the largest width and appearing in pile A are utilized.

Sub-pattern 14 is cut out from the main pattern 6 along the side cutting lines 21 and 22, and the lower and upper cutting lines 23 and 24, the pattern itself being provided with side edges 21' and 22' and bottom and top edges 23' and 24'. Here again, the side edges 21' and 22' converge towards each other from the lower portion of the pattern to its top portion, and, therefore, the top edge 24' is of less extent than the bottom edge 23'.

It is desired to point out that when the skins are assembled the side edges 17' and 21' are in alignment, and the side edges 19' and 22' are in alignment.

The sub-patterns 15 and 16 are cut similarly to the patterns 13 and 14, pattern 15 being cut along the side cutting lines 25 and 26, and the common bottom cutting line 24 and top cutting line 27 to provide a sub-section having side edges 25' and 26', a zig-zag bottom edge 28, and a top cutting edge 27'. Here again, the side edges 25' and 26' converge from the bottom portion of the sub-pattern 15 towards the top portion thereof.

Sub-pattern 16 is cut along side cutting lines 29 and 30, common bottom cutting line 27 and top cutting line 31 to provide the section with side edges 29' and 30', bottom edges 32' and top edge 31'.

It is to be noted that the side edges of the various sub-patterns are as shown in Figure 7 before cutting in alignment, and that the side edges converge towards each other from the bottom to the top of the main pattern.

Sub-patterns 13A, 13B, 13C, 13D, 13E, 13F, 13G and 13H; 14A, 14B, 14C, 14D, 14E, 14F, 14G, 14H; 15A, 15B, 15C, 15D, 15E, 15F, 15G, 15H; 16A, 16B, 16C, 16D, 16E, 16F, 16G and 16H, are formed similarly to patterns 13, 14, 15, 16, respectively.

While in the above description, it has been indicated that a series of patterns 13A to 13H may be formed, in actual practice it is only necessary to form sub-pattern 13, and similarly sub-patterns 14, 15 and 16. This is true, since the sub-patterns of each group are, in the preferred form of the invention, substantially identical, although, if desired, under some circumstances, there can be some change. In other words, all the patterns 13 to 13H, inclusive, are practically the same; all the sub-patterns 14 to 14H inclusive are the same; all the sub-patterns 15 to 15H inclusive are the same; and sub-patterns 16 to 16H, inclusive, are the same. While the sub-patterns constituting each group, as for example, group 13 to 13H are the same, the sub-patterns of this group are different from the sub-patterns of group 14 to 14H.

It is to be noted that sub-pattern 14 has an average width less than sub-pattern 13, and that sub-pattern 15 has an average width less than sub-pattern 14, and that sub-pattern 16 has an average width less than sub-pattern 15. The length of the sub-pattern sections 13, 14, 15 and 16 are approximately the same, but this is dictated by the size of the skins. Most of the skins coming from a particular country, or a particular section of a country, run fairly uniform as to size. It is to be noted that as shown in Fig. 1, the skins when nailed on the board are stretched vertically as to length, so that the skins, as a general rule, will have approximately the same stretched length. Naturally, the width of the skin will vary, and this is taken care of by assorting the skins into piles A, B, C and D.

The above clearly brings out why the sub-patterns 13, 14, 15 and 16 are about the same length, but vary in width. There is an additional reason, and that is, the final garment is of a greater transverse width at its bottom than at its top.

It is an entirely novel step in the present invention to nail the skins to size, or stated differently, to stretch the skins to size. The stretching step is carried out by taking the fur skin 1 and wetting the leather side thereof. It is then nailed down on the board 2 by the nails 3, and allowed to remain there until dry. This may take four (4) or five (5) hours, or overnight, at ordinary room temperature, but if the operation is carried out in a drying room, this can be carried our in from fifteen (15) minutes to one-half (½) hour.

The skin 1 is given a permanent stretch by the procedure outlined, and this is important in the later satep of the present method of manufacturing fur coats. The usual practice is to wet the leather of a skin and stretch it out by hand. No time is allowed for the stretched skin to dry. The cutter immediately cuts the skin, after wetting and stretching. In accordance with the present invention, the leather is wetted and drying occurs while the skin is nailed, and sufficient time is allowed for this drying to occur while the skin 1 is nailed on the board. In accordance with the old practice, where the skins were merely wet, stretched by the cutter and then cut, on assembling the skins into the garment, the skins were not uniform, and it was necessary to nail out the garment in an attempt to bring out the fullness of the skin, and to make the vertical seams "run straight." Sometimes, these seams, when manufactured in accordance with the above, instead of running in a straight line, run in a broken line or curved line, and it is this defect which it is attempted to remedy in the old method by nailing after the formation of the garment.

In accordance with the preesnt invention, due to the fact that the skins are individually given a permanent stretch, as set forth, and further, because they are cut with the aid of a patetrn and their edges are uniform, these skins when assembled in a garment produce a garment which has straight vertical seams.

The above points out how the sub-patterns 13, 14, 15 and 16 are made. The method of using these patterns in accordance with the present invention will now be set forth.

Sub-pattern 13 is placed on the leather side of the skin 33 having a top edge 35, bottom edge 36, and side edges 34 and 37, respectively, as shown in Fig. 8, said skin being provided with slits 4 and 5, the skin itself having been taken from the pile A.

The zig-zag upper edge 20' of the sub-pattern 13 is positioned closely adjacent the top edge 35 of the skin 33. The lower edge of the pattern 13 is usually positioned a short distance from the lower edge 36 of the skin 33.

The cutter then proceeds to cut the skin 33 around the pattern along the pattern edges 17', 20' and 19'. It is to be noted that no cutting is done along the bottom edge of this particular pattern, since it is desirable for the cut fur skin to have a slight excess of length. The skin 33 and like skins when assembled, as hereinafter more specifically described, form the extreme bottom portion of the coat and the assembled skins are usually placed on the main patterns and the bottom of the coat squared in accordance with the contour of the bottom edge of the main pattern.

The sub-pattern 14 is placed on skin 38, having top and bottom edges 39 and 40, respectively, and side edges 41 and 42, respectively. The cutter cuts along cutting edges 21', 22', 23' and 24'. The fur skin 38 is selected from the pile B.

A fur skin 43 selected from the pile C, has the subpattern 15 laid on its leather side between the guiding marks 4 and 5, said skin being provided with side edges 44 and 45, and top and bottom edges 46 and 47. The skin is cut along the cutting line 25', 26', 27' and 28 of sub-pattern 15.

Sub-pattern 16 is laid between the marks 4 and 5 on the leather side of the fur skin 48, the latter being provided with side edges 49 and 50, and top and bottom edges 51 and 52, respectively. The cutter cuts the skin along the pattern edges 29', 30' and 32'. The skin is not cut along the top cutting line 31' of the sub-pattern 16, since the top portion of this skin, together with other skins of a similar type, are adapted to form the top edge of the assembled garment and facilitates the squaring of the top edge of the garment.

The additional length of fur left at the bottom of the assembled fur garment and the top also furnishes a surplus, so that in case of a particular fur, some shrinkage should occur, the coat can still be according to the predetermined length, and this is obtained by simply cutting less of the surplus fur at the bottom and/or top of the garment.

One cutter will cut and produce a great number of fur skins 33a, according to sub-pattern 13, and put the fur skins into a pile; another cutter will cut skins 38a according to sub-pattern 14, and will put this into a separate pile; a third cutter will cut skins 43a according to sub-pattern 15 and the skins will be put in a third pile; and a fourth cutter will cut skins 48a in accordance with sub-pattern 16, and these skins will be put in a fourth pile, the first pile containing skins 33a, the second pile containing skins 38a; the third pile containing skins 43a and and the fourth pile containing skins 48a.

A number of skins 33a, the latter having been produced with the aid of sub-pattern 13, are assembled by the assorter or matcher, into a row of skins. Above this row, there is also assembled a second row, made up of a series of skins 38a cut by the aid of sub-pattern 14. Above this second row is assembled a third row of skins 43a, cut by the aid of sub-pattern 15; and thereabove is assembled a further row of skins 48a, cut by the aid of sub-pattern 16, as shown in Fig. 12.

These rows of skins are assembled on a table, and as assembled formulate the shape of the final garment, with the exception, of course, that the garment that is formulated is not provided with any sleeves or collar, all as shown in Fig. 12. The assorter or matcher who assembles the furs, which are preferably of one color, of course, keeps in mind the shades of the fur skins. In other words, the fur skins are matched so that when the final garment is produced there is no noticeable contrast between different parts of the garment.

The row R₁ of fur skins containing a series of fur skins 33a to 33i is given to the sewer and is sewed to form a fur panel P₁, such as shown in Fig. 13. Similar panels are formed from rows R₂, R₃ and R₄, and containing skins 38a to 38i, 43a to 43i, and 48a to 48i, respectively, and these are given to the sewer to be formulated into panels P₁, P₂, P₃ and P₄, panel P₁ being shown in Fig. 13.

As shown in Figure 12, the rows of skins are set up so that the adjacent longitudinal edges of adjacent skins in row R₁ are in line with the adjacent longitudinal edges of adjacent skins in rows R₂, R₃, and R₄, so that a perfectly straight seam is formed between skins 33a and 33b, 38a and 38b, 43a and 43b, and 48a and 48b. In other words, the entire longitudinal seam of the garment, when these skins are sewed together, occupies the same relationship as shown in Fig. 12 of the matched skins before sewing. The transverse edges between skins 33a, 38a and between skins 33b and 38b are also respectively transversely in alignment.

When the skins are sewed together to form the body portion of the garment, as shown in Fig. 14, this uniformity is preserved.

It will be clear from the above that by utilizing the sub-patterns sized according to the size of the fur skin and with regard to the form of the coat, a body garment is produced in which the longitudinal lines of the respective furs are matched straighter than ever before produced, and that similarly, the transverse lines where the furs are matched are straighter than heretofore ever produced.

Figure 15 shows a modified form which the sub-patterns may take, said sub-patterns being identified by numerals 53, 54 and 55. These patterns are made for a princess style garment, which is essentially different from the swagger type garment. One of the differences is that the garment is tight fitting at the waist and is considerably wider at the bottom relative to the waist measurement of the garment. In utilizing the present invention for the cutting of furs for such a garment, the patterns are only utilized for cutting that portion of the body garment extending from the waist to the bottom. The same principle in making the patterns and cutting the fur skins and assembling the fur skins into a garment is applied to the present garment, the only difference being that three sub-patterns are necessary, and the shape is slightly different.

It is desired to point out that the invention is capable of being applied to the production of garments of various shapes. Of course, in making the sub-patterns, the shape of the desired garment must be taken into consideration. The number of fur skins to be cut for the bottom portion of the garment will, of course, be determined by the width of the bottom portion of the garment, and the same applies to the top portion of the garment, with the exception, of course, that smaller sized and/or shaped skins will be used in the top portion of the garment.

As before described, the skins are nailed individually for the purpose of getting as much stretch out of each skin as possible, and for the further reason that when the skins are joined or assembled, and are straightened out on a master pattern, the straightening out is relatively simple, since the furs have a permanent stretch.

Figure 2:
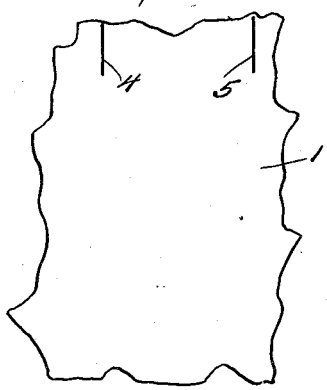
Figure 2 is a plan view of the stretched fur pelt which has been provided with short splits adjacent one of its edges, said splits functioning to divide the skin or pelt into superior parts and inferior parts, the latter being adapted to be discarded.
Figure 3:
Figure 4:
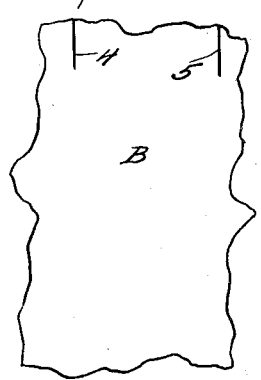
Figure 5:
Figure 6:

After the fur skins are sewed, as shown in Figure 14, the sewed and assembled skins are placed on a board on which the master pattern is marked off, which corresponds to the pattern shown in Figure 2, before it is cut into the sub-patterns, the edges of the assembled garments are then "squared off".

As shown in Figure 14, the garment is provided with a facing 56 and 56' at the edge of the finished garment, said facing having been sewed to the outside edges of the pelts 33a, 43a, 38a and 48a, respectively, and to the outside edge of pelts 33i, 38i, 43i and 48i, respectively.

After the panels have been sewed together to form the complete body portion of the garment, as shown in Fig. 14, the master pattern, as shown in Fig. 7, is placed on the garment and the arm holes are marked out on the garment following the contour of the arm holes 57 and 58 of the master pattern. The top and bottom edges of the garment are also marked from the master pattern for final trimming.

What is claimed is:—

1. The method of preparing fur pelts for fitting into a finished garment comprising stretching the fur pelt to its ultimate stretched condition, marking the fur pelt to indicate the maximum usable amount of fur, and cutting in accordance with the markings and with a pattern corresponding to a predetermined section of a finished garment so that the fur pelt may be fitted into a finished garment in a position corresponding to its stretched cut size.

2. The method of preparing fur pelts for fitting into a finished garment comprising stretching the fur pelt to its ultimate stretched condition, slitting the fur pelt to indicate the maximum usable amount of fur, and cutting in accordance with the markings and with a pattern corresponding to a predetermined section of a finished garment so that the fur pelt may be fitted into a finished garment in a position corresponding to its stretched cut size.

3. The method of preparing fur pelts for fitting into a finished garment made of a plurality of fur pelts, each cut to fit into a predetermined position in the garment such that the finished garment has straight vertical seams, comprising stretching each fur pelt to its ultimate stretched condition, marking the fur pelt to indicate the maximum usable amount of fur and cutting in accordance with the markings and with a pattern corresponding to a predetermined section of a finished garment, so that the fur pelt may be fitted into a finished garment in a position corresponding to its cut stretched size and in alignment with other pelts which have been similarly treated.

4. The method of preparing fur pelts for fitting into a finished garment made of a plurality of fur pelts, each cut to fit into a predetermined position in the garment such that the finished garment has straight vertical seams, comprising stretching each fur pelt to its ultimate stretched condition, slitting the fur pelt to indicate the maximum usable amount of fur and cutting in accordance with the markings and with a pattern corresponding to a predetermined section of a finished garment, so that the fur pelt may be fitted into a finished garment in a position corresponding to its cut stretched size and in alignment with other pelts which have been similarly treated.

5. The method of making a fur garment comprising providing a series of longitudinally extending pelt cutting patterns, the patterns when assembled longitudinally extending substantially the full length of the body portion of the garment to be made therefrom, said patterns having a maximum width corresponding to the pelts of the largest width to be used for the production of the garment, stretching pelts to their ultimate stretched condition, sorting the pelts in conformity with the sizes of the respective patterns, assembling the pelts on each of said pelt cutting patterns, cutting each pelt in accordance with its respective pattern, and assembling the pelts into a garment.

HARRY LINET.